(12) United States Patent
McMahon et al.

(10) Patent No.: US 11,653,591 B2
(45) Date of Patent: May 23, 2023

(54) SEED FIRMER

(71) Applicant: Precision Planting LLC, Tremont, IL (US)

(72) Inventors: Brian McMahon, Deer Creek, IL (US); Todd Swanson, Morton, IL (US); Michael Strnad, Delavan, IL (US)

(73) Assignee: Precision Planting LLC, Tremont, IL (US)

( * ) Notice: Subject to any disclaimer, the term of this patent is extended or adjusted under 35 U.S.C. 154(b) by 505 days.

(21) Appl. No.: 16/488,698

(22) PCT Filed: Mar. 1, 2018

(86) PCT No.: PCT/US2018/020452
§ 371 (c)(1),
(2) Date: Aug. 26, 2019

(87) PCT Pub. No.: WO2018/160834
PCT Pub. Date: Sep. 7, 2018

(65) Prior Publication Data
US 2020/0015411 A1    Jan. 16, 2020

Related U.S. Application Data

(60) Provisional application No. 62/465,646, filed on Mar. 1, 2017.

(51) Int. Cl.
*A01C 5/06* (2006.01)
(52) U.S. Cl.
CPC .................... *A01C 5/068* (2013.01)

(58) Field of Classification Search
CPC ...................................................... A01C 5/068
See application file for complete search history.

(56) References Cited

U.S. PATENT DOCUMENTS

| | | | |
|---|---|---|---|
| 4,596,734 A | 6/1986 | Kramer | |
| 5,425,318 A * | 6/1995 | Keeton | A01C 5/068 111/197 |
| 9,155,244 B2 | 10/2015 | Schaffert | |
| 2005/0061219 A1* | 3/2005 | Sauder | A01C 5/068 111/188 |
| 2011/0193342 A1 | 8/2011 | Hoefelmayr | |
| 2014/0076215 A1 | 3/2014 | Peter | |
| 2014/0209001 A1 | 7/2014 | Schaffert | |
| 2015/0250094 A1 | 9/2015 | Hodel et al. | |
| 2016/0262304 A1 | 9/2016 | Hagney et al. | |

(Continued)

FOREIGN PATENT DOCUMENTS

| | | | | |
|---|---|---|---|---|
| EP | 1461988 A1 * | 9/2004 | ............. | A01C 5/068 |
| WO | WO-9317545 A1 * | 9/1993 | ............. | A01C 5/068 |
| WO | 2015171908 A1 | 11/2015 | | |

OTHER PUBLICATIONS

BigIron Auctions, Keeton Case IH Seed Firmer Tails, Feb. 7, 2017 (Year: 2017).*

(Continued)

*Primary Examiner* — Thomas B Will
*Assistant Examiner* — Ian A Normile

(57) ABSTRACT

Embodiments of the present disclosure relate to a seed firmer having a resilient portion and a firming portion that are molded together into a unitary part with each portion being a different material.

14 Claims, 9 Drawing Sheets

(56) References Cited

U.S. PATENT DOCUMENTS

2017/0086362 A1* 3/2017 Natarjan ................ A01C 7/205

OTHER PUBLICATIONS

Tony Rogers, Creative Mechanisms Blog, "Everything You Need To Know About Overmolding Prototypes", Aug. 26, 2015, creativemechanisms.com (Year: 2015).*

Polymer Plastics Company, LC, "Cast Nylon 6", https://www.polymerplastics.com/mechanical_castn.shtml, snapshot with pertinent information by web.archive.org as early as Jan. 27, 2015 (Year: 2015).*

European Patent Office, Search Report for related European Patent Application EP 18 76 0732, dated Dec. 4, 2020.

PCT /US 18/20452 US PCT Receiving Office, International Search Report for related International Application No. PCT/US2018/020452, dated May 1, 2018.

* cited by examiner

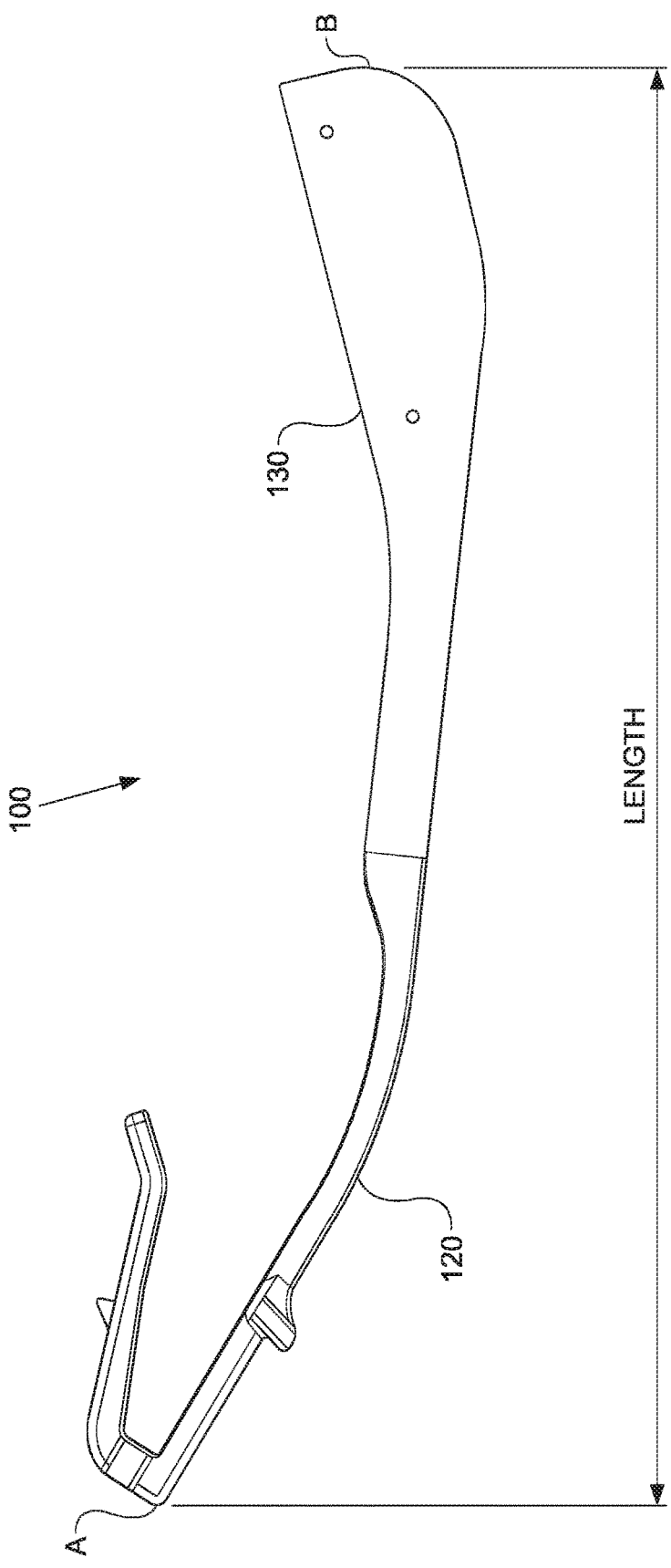

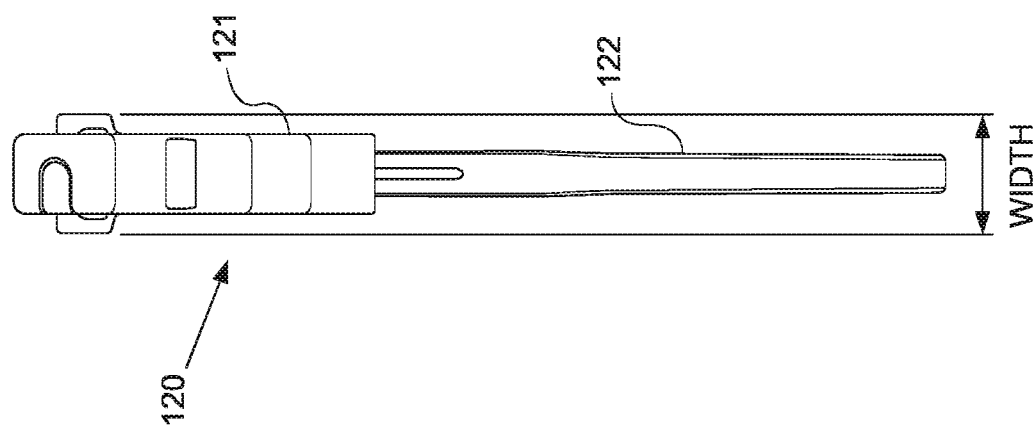
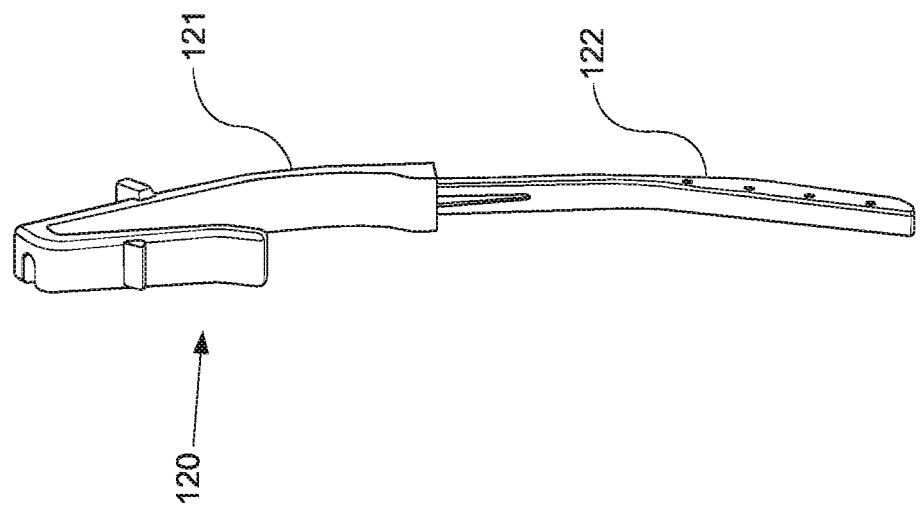

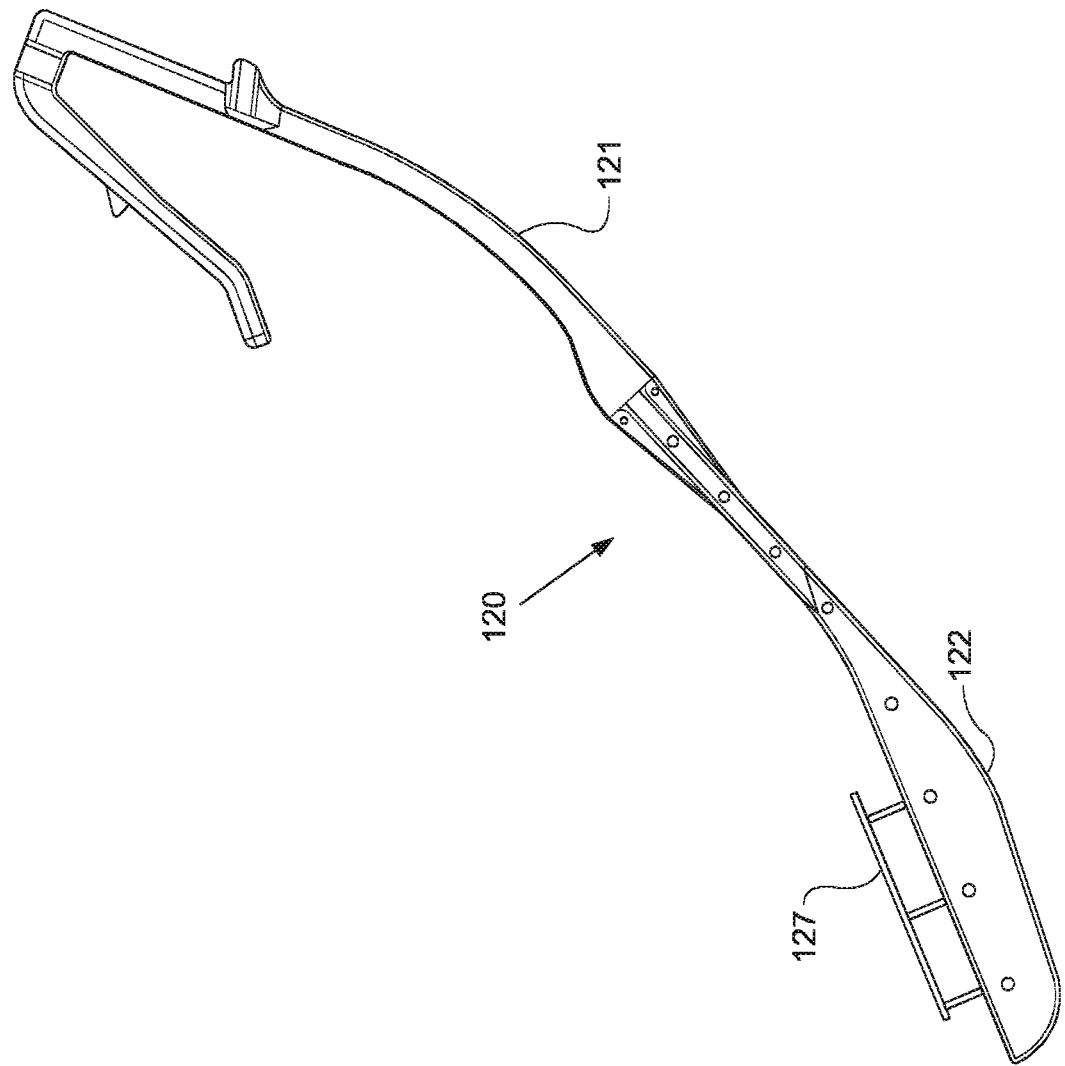

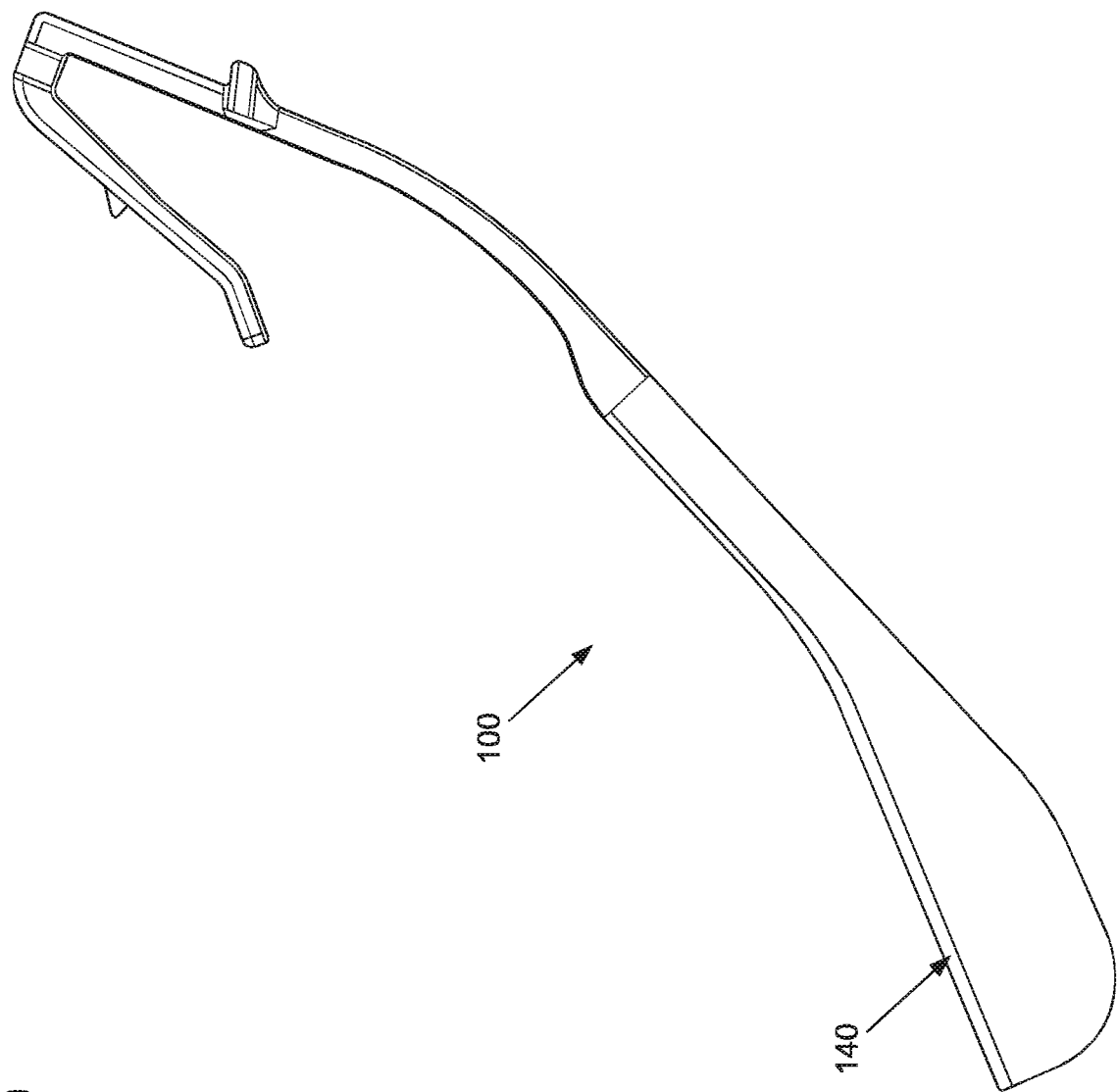

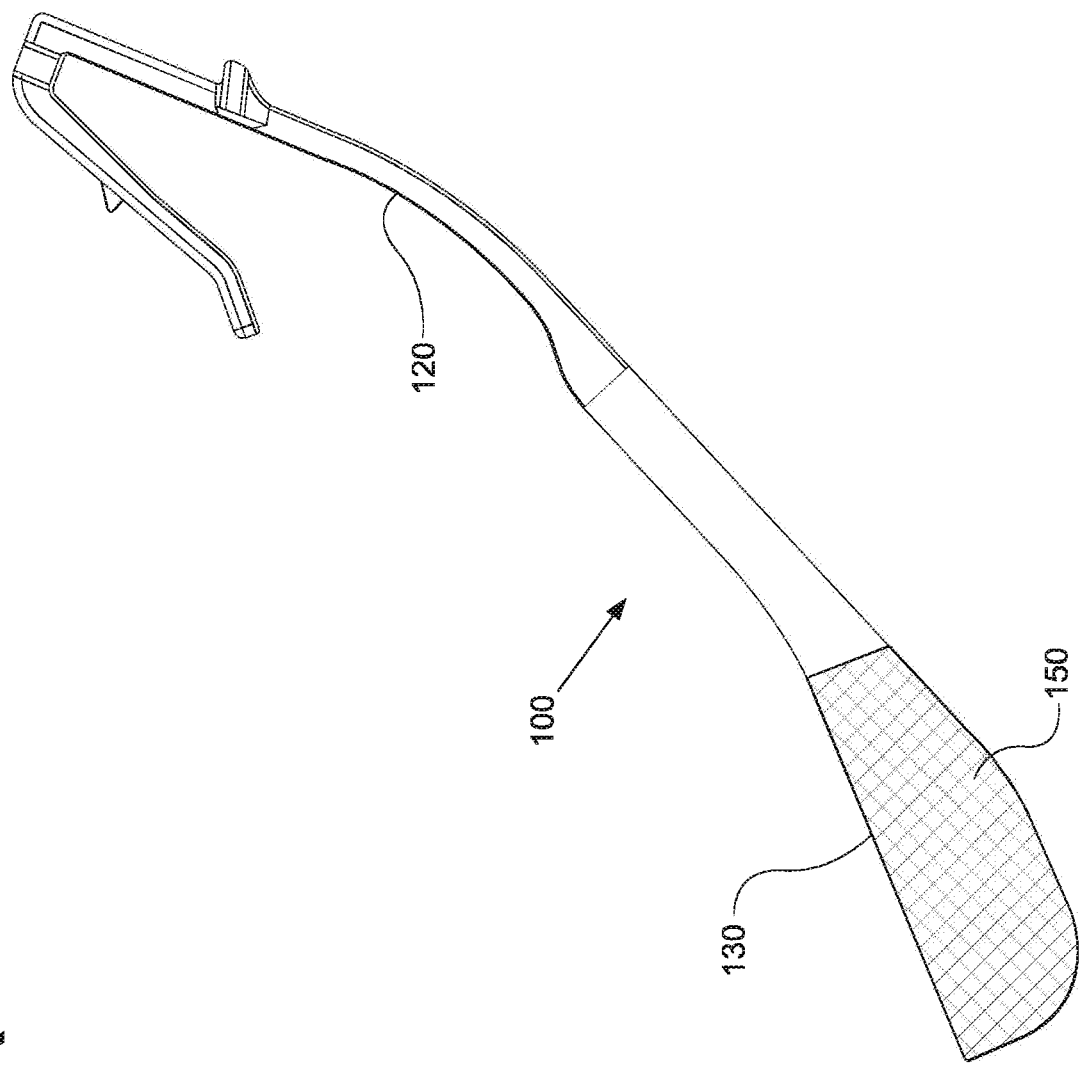

SEED FIRMER

RELATED APPLICATIONS

This application claims the benefit of U.S. Provisional Application No. 62/465,646 filed on Mar. 1, 2017 entitled: SEED FIRMER.

TECHNICAL FIELD

Embodiments of the present disclosure relate to seed firmers for firming seeds during planting.

BACKGROUND

Seed firmers have generally been molded from one type of material. This provides for ease of manufacture. But there can be different needs for different parts of the seed firmer. Generally, the seed firmer needs to be resilient to be able to firm seeds. Materials that meet the resiliency requirement may not provide other desired properties, such as low soil adhesion.

BRIEF DESCRIPTION OF THE DRAWINGS

The present disclosure is illustrated by way of example, and not by way of limitation, in the figures of the accompanying drawings and in which:

FIG. 3 shows a side elevation view of a seed firmer.

FIG. 4A shows a perspective view of the resilient portion.

FIG. 4B shows a top plan view of the resilient portion of FIG. 4A.

FIG. 5B shows a side elevation view of the resilient portion having a bracket.

FIG. 6 shows a side elevation view of a seed firmer having a channel.

FIG. 7A shows a side elevation view of a seed firmer having a layer disposed over the firming portion.

BRIEF SUMMARY

Embodiments of the present disclosure relate to a seed firmer with a unitary construction molded from two parts.

DETAILED DESCRIPTION

Figure 1:
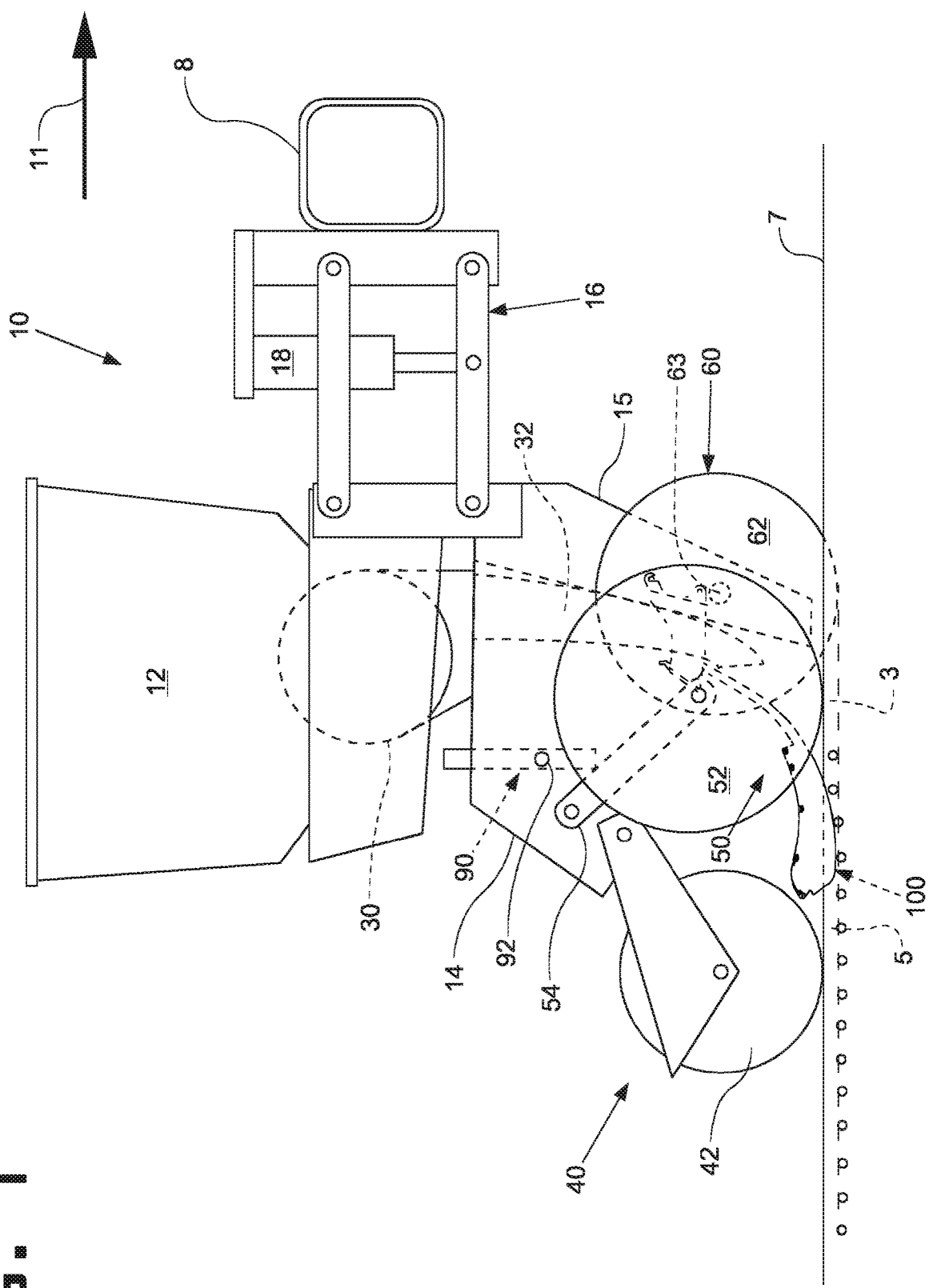
FIG. 1 shows a right side elevation view of a row unit of an agricultural planter with an embodiment of a seed firmer mounted to a shank of the row unit.

Referring to the drawings, wherein like reference numerals designate identical or corresponding parts throughout the several views, FIG. 1 is a side elevation view of a row unit 10 of a conventional agricultural planter with a seed firmer 100 mounted to the row unit 10. It should be understood that the planter comprises a plurality of row units 10 mounted along the toolbar 8 in spaced relation. The row units 10 are mounted to the toolbar 8 by a parallel arm linkage 16 permitting the individual row units 10 to independently translate vertically with respect to the toolbar 8. The row unit 10 is shown as incorporating an actuator 18 mounted to the toolbar 8 and the parallel arm linkage 16 to apply supplemental downpressure to the row unit 10.

The row unit 10 includes a frame 14 having a downwardly extending shank 15. The frame 14 supports an opening disc assembly 60, a gauge wheel assembly 50 and a closing assembly 40. The opening assembly 60 includes two opening discs 62 rotatable about a shaft 63 supported by the shank 15. The opening discs 62 are disposed to cut a v-shaped trench 3 in the soil surface 7 as the row unit is drawn through the field in the direction of arrow 11. The gauge wheel assembly 50 includes two gauge wheels 52 pivotally mounted to the frame 14 by gauge wheel arms 54. A depth adjustment assembly 90 adjustably positions the gauge wheels 52 with respect to the opening discs 62 by contacting the gauge wheel arms 54 to limit the upward travel of the gauge wheel arms 54, thus limiting the depth of the trench 3 opened by the opening discs 62. The closing assembly 40 may include closing wheels 42 disposed to move soil back into the trench 3 to cover the seeds previously deposited as discussed below.

Continuing to refer to FIG. 1, seeds 5 are communicated from a hopper 12 to a seed meter 30 which dispenses seeds into the seed tube 32 extending downwardly and rearwardly toward the seed trench 3 between the opening discs 62 and the gauge wheels 52.

In operation, as the planter is drawn through the field in the direction of arrow 11, the seeds 5 dispensed by the meter 30 are directed downwardly and rearwardly by the seed tube 32 where they are deposited in the seed trench 3 formed by the opening discs 62. A seed firmer 100 (discussed in detail below) presses the deposited seeds 5 into the soil at the bottom of the seed trench 3 before the seeds are covered with soil by the closing assembly 40.

Figure 2:
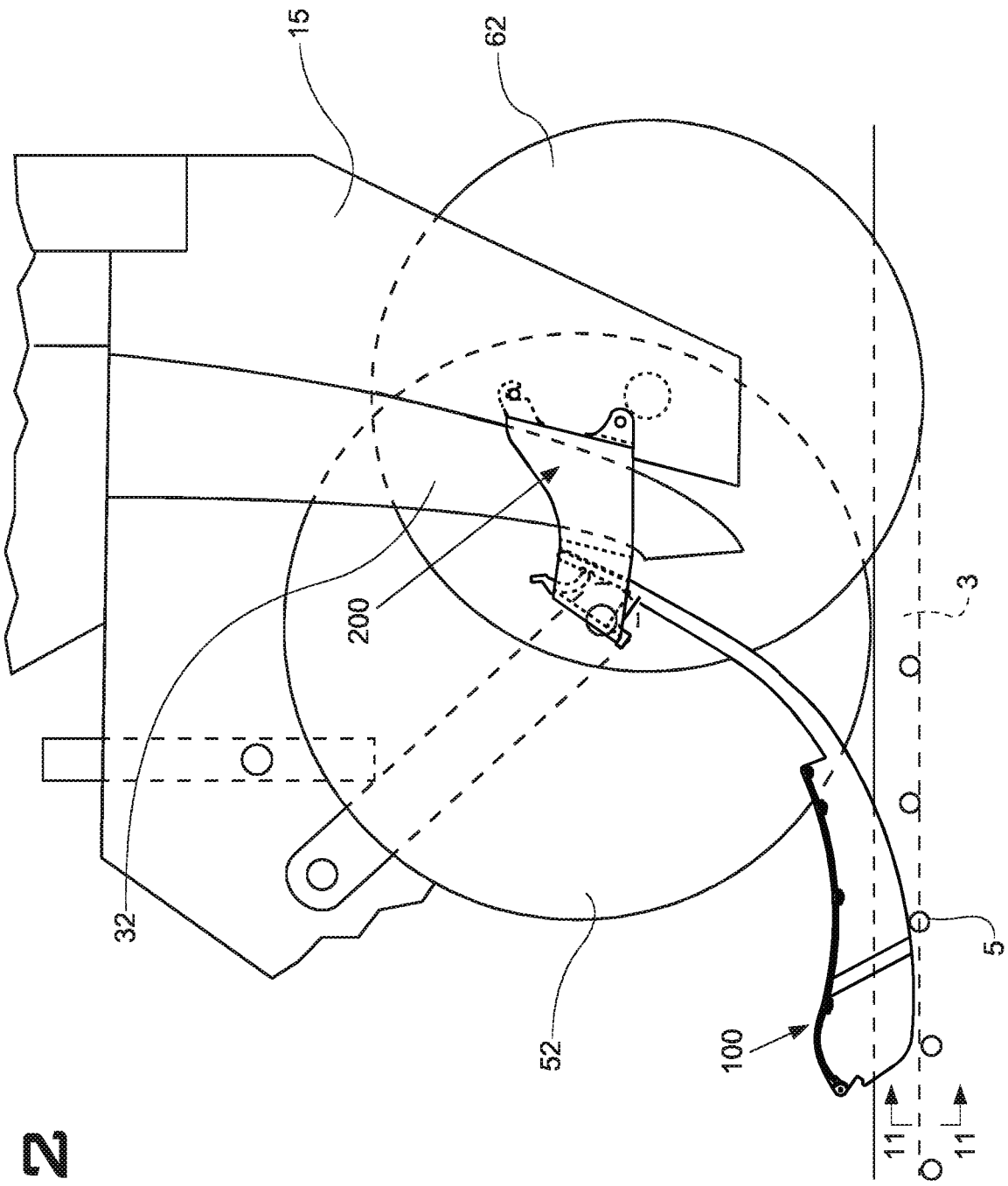
FIG. 2 shows an enlarged view of FIG. 1 with the right opening disc and gauge wheel removed for clarity to show the seed firmer mounted to the shank of the row unit.

FIG. 2 is an enlarged view of FIG. 1 with the right side gauge wheel 52 and right side opening disc 62 showing an embodiment of the seed firmer 100 and the bracket 200 mounted to the shank 15 of the row unit 10.

A seed firmer 100 having two portions that are molded together into a unitary part. The seed firmer 100 has a resilient portion 120 and a firming portion 130. Resilient portion 120 and firming portion 130 are made from different materials.

Any molding method of molding two different materials together can be used. Examples of molding include, but are not limited to, compression molding and injection molding.

In one embodiment, the resilient portion 120 is made from a material that retains its shape during and after seed firming. In one embodiment, the material is PA6 nylon. In one embodiment, the material is Ultramid™ B40-01 nylon from BASF.

The resilient portion 120 has a first portion 121 and a second portion 122 as illustrated in FIGS. 4A and 4B in accordance with one embodiment. Second portion 122 is the portion that is molded together with firming portion 130. In one embodiment, the second portion 122 has a width that is 30 to 70% of the width of the first portion 121. In other embodiments, the width is 40 to 60%, 45 to 55%, or about 50% of the width of the first portion. First portion 121 attaches to the agricultural implement 10, which can be by fastener (e.g., bolts or screws), or first portion 121 can form a clip to be inserted into bracket 200.

Figure 5A:
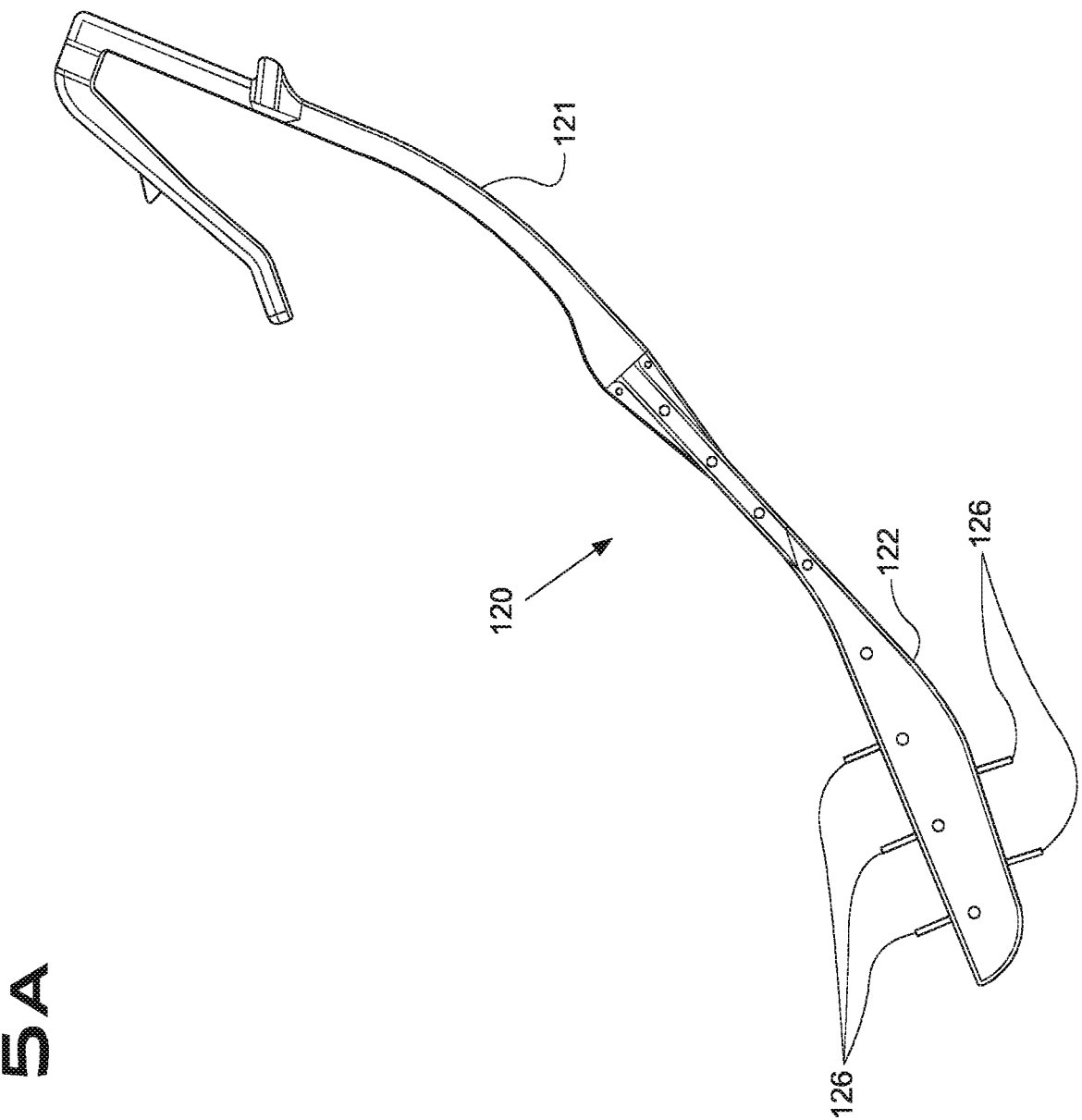
FIG. 5A shows a side elevation view of the resilient portion having posts.

To assist with aligning resilient portion 120 in a mold as firming portion is molded over resilient portion 120, alignments may be further included. In one embodiment illustrated in FIG. 5A, the alignments are one or more posts 126. Posts 126 can be part of the material for resilient portion 120 or added separately. Posts 126 extend from resilient portion 120 to the edge of a mold. In another embodiment illustrated in FIG. 5B, a bracket 127 can be included as part of resilient portion 120. Bracket 127 extends into the mold to secure resilient portion during the molding process. After molding, the portion of bracket 127 that extends beyond firming portion 130 can be removed.

In one embodiment, the firming portion 130 is made from a material that has low adhesion to soil. In one embodiment, the material is ultra high molecular weight polyethylene (UHMWPE). In one embodiment, the material is Hi-Zex Million™ UHMWPE from Mitsui Chemicals. In one embodiment, the UHWMPE has a weight average molecular mass of 0.5 to 10 million amu. In other embodiments, the weight average molecular mass is 1 to 10 million, 1 to 7 million, 2 to 7 million, or 3 to 7 million.

As illustrated in FIG. 3, the seed firmer 100 has a length defined by a distance between A and B. A is the point on resilient portion 120 that is farthest from the firming portion 130. B is the point on firming portion 130 that is farthest from the resilient portion 120.

In one embodiment, firming portion 130 is disposed over 30 to 70% of the length of seed firmer 10. In other embodiments, firming portion 130 is disposed over 40 to 60%, 45 to 55%, or about 50% of the length of seed firmer 10.

Seed firmer 100 can have any shape, such as commercially available farmers or rebounders. Examples of shapes can be found in WO2014066664 and WO2015171908, which are incorporated herein by reference. Further, seed firmer 100 can include additional features used with seed firmers, such as fluid delivery tubes, which can be disposed on seed firmer 100 or disposed through seed firmer 100 as illustrated in WO2014066664 and WO2015171908. FIG. 6 illustrates a seed firmer 100 having a channel 140, which can receive a fluid delivery tube. In one example, a top surface of a lower portion of the firmer 100 can include the channel 140 that is sized to receive a fluid delivery tube. In another example, a channel 140 is recessed within the seed firmer or disposed through seed firmer 100.

In another embodiment, instead of molding the firming portion 130 to resilient portion 120, firming portion 130 and resilient portion can be fastened together. Fastening includes, but is not limited to, screw, bolt, rivet, heat staking, adhesive, and non-removable snap fit.

Figure 7B:
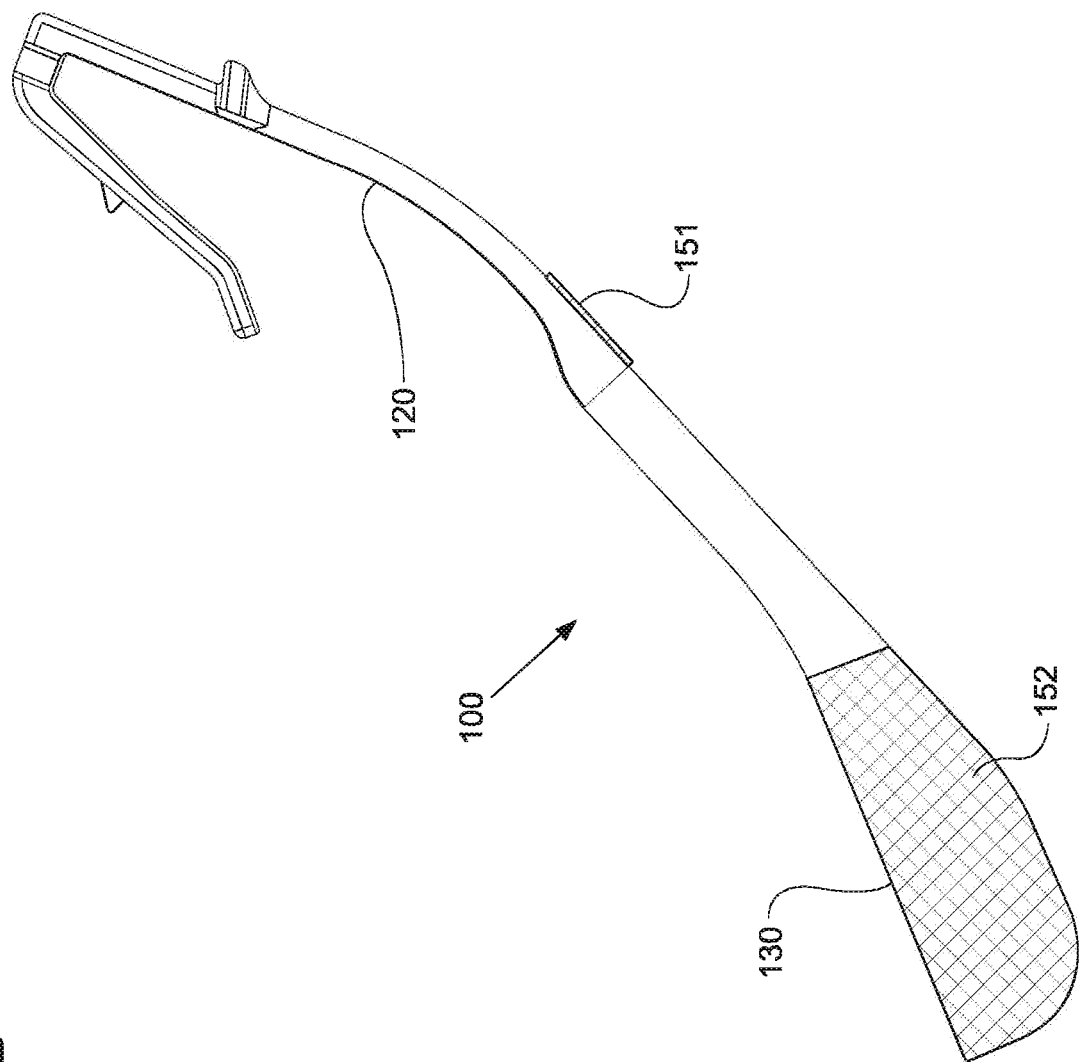
FIG. 7B shows a side elevation view of the seed firmer of FIG. 7A further including a second layer disposed over the resilient portion.

In another embodiment illustrated in FIGS. 7A and 7B, a layer 150 can be disposed over a portion of seed firmer 100. Layer 150 can be disposed over firming portion 130, resilient portion 120, or both. Layer 150 can be the material that has low adhesion to soil described above. The layer 150 can be adhered using an adhesive. The layer 150 can have a thickness such that layer 150 can be manipulated to conform to the shape of the part that it is disposed over. This could be a thin sheet. By having a layer 150, two different materials can be used as described above. While layer 150 could be one layer, layer 150 could be a first layer 151 for disposing over the resilient portion 120 and a second layer 152 for disposing over the firming portion 130.

What is claimed is:

1. A seed firmer comprising:
   a resilient portion for attaching to an agricultural implement, wherein the resilient portion has a first portion for attaching to the agricultural implement and a second portion; and
   a firming portion having a width for contacting seeds in a seed trench, wherein the resilient portion and the firming portion are each made from different materials with the firming portion being made of polyethylene, wherein the firming portion is molded over the second portion of the resilient portion to form a unitary seed firmer and extends along a length of the second portion of the resilient portion that is equal to or greater than a length of the first portion, and wherein the second portion of the resilient portion has a width that is 30 to 70% of a width of the first portion of the resilient portion.

2. The seed firmer of claim 1, wherein the resilient portion is made from PA6 nylon.

3. The seed firmer of claim 1, wherein the firming portion is made from ultra high molecular weight polyethylene.

4. The seed firmer of claim 1, wherein the firming portion is disposed at 30 to 70% of the length of the seed firmer.

5. The seed firmer of claim 1, wherein the firming portion is disposed at 40 to 60% of the length of the seed firmer.

6. The seed firmer of claim 1, wherein the firming portion is disposed at 45 to 55% of the length of the seed firmer.

7. The seed firmer of claim 1, wherein the firming portion is disposed at 50% of the length of the seed firmer.

8. The seed firmer of claim 1, wherein the second portion has a width that is 40 to 60% of a width of the first portion.

9. The seed firmer of claim 1, wherein the second portion has a width that is 45 to 55% of a width of the first portion.

10. The seed firmer of claim 1, wherein the second portion has a width that is 50% of a width of the first portion.

11. The seed firmer of claim 1, wherein the seed firmer further comprises a channel.

12. The seed firmer of claim 1, wherein the resilient portion further comprises at least one post.

13. The seed firmer of claim 1, wherein the resilient portion further comprises a bracket.

14. The seed firmer of claim 1, wherein the width of the firming portion, the width of the first portion of the resilient portion, and the width of the second portion of the resilient portion are aligned with a lateral width of the seed trench.

\* \* \* \* \*